Nov. 12, 1963

J. M. HORETH ETAL 3,110,878

TRANSCRIPTION OF LINEAR TRACES

Filed Nov. 3, 1958

John M. Horeth
Jesse D. Skelton
William J. Stark

Inventors

By W.V. Heilman Attorney

Nov. 12, 1963

J. M. HORETH ET AL

3,110,878

TRANSCRIPTION OF LINEAR TRACES

Filed Nov. 3, 1958

TRANSCRIBED
VDF SECTION

CONVENTIONAL
RECORDS

John M. Horeth
Jesse D. Skelton   Inventors
William J. Stark

By W. O. Heilman  Attorney

FIG. 3

John M. Horeth
Jesse D. Skelton
William J. Stark  Inventors
By James A. Reilly  Attorney

FIG. 4

John M. Horeth
Jesse D. Skelton
William J. Stark

Inventors

By James A. Reilly  Attorney 3,110,878
TRANSCRIPTION OF LINEAR TRACES
John M. Horeth, Jesse D. Skelton, and William J. Stark, Tulsa, Okla., assignors to Jersey Production Research Company, a corporation of Delaware
Filed Nov. 3, 1958, Ser. No. 771,668
20 Claims. (Cl. 340—15.5)

This invention relates to an apparatus and process for translating linear graphs into graphs that possess a reproducible quality. The invention finds particular application in the field of seismic prospecting for the analysis and preparation of improved seismic records. It especially concerns an apparatus and process for translating oscillographic-type seismic traces into phonographically reproducible traces wherein the latter traces are preferably arranged to form a corrected seismic section. The invention further particularly concerns an apparatus and process for translating oscillographic-type seismic traces into variable-density traces which are individually corrected for seismic errors.

This application is a continuation-in-part of application Serial No. 577,175, filed April 9, 1956, now abandoned, in the names of the same inventors.

The application of seismic techniques in prospecting for mineral deposits is widely recognized and used by persons skilled in the art. Generally speaking, a seismic disturbance is created at a point near the surface of the earth, and seismic waves are transmitted into the earth from the point of disturbance. As these waves travel downwardly through the earth, they are at least partially reflected by subterranean structures and transmitted back toward the surface of the earth. By arranging sensitive seismic transducers such as geophones in the general area of the seismic disturbance point, it is possible to detect the reflected waves as they arrive at the surface of the earth. Furthermore, by connecting the transducers with suitable recording and timing devices, it is possible to determine very accurately the arrival times of the seismic waves at the transducers relative to the time at which the seismic disturbance was created. Then, by knowing or approximating the velocity of seismic waves through the area or region under study, it becomes possible to ascertain the subterranean structure of the region by utilizing and interpreting the records that are formed by the seismic transducers.

The general procedure of seismic prospecting just described and the various pieces of equipment that have been mentioned are well known and well understood by persons skilled in the art, and it is accordingly not intended to discuss these matters in great detail in the present description. Instead, it is intended to indicate the nature of the records that are generally obtained and to further indicate how the present invention improves upon these records.

In the past, most seismic information has generally been recorded using either reflecting-mirror galvanometers or oscillographic pen recorders. Thus, the train of signals generated by each geophone or seismic transducer is transmitted to a galvanometer or pen recorder and a suitable record medium such as a photographic film or record paper moved relative to the recording device. A record in the form of an oscillographic or sinusoidal trace is thereby generated or formed on the record medium, the amplitude of the trace being directly related to the magnitude of the signal which is transmitted by the seismic transducer to the recording device.

Records of the oscillographic type have been very helpful to persons engaged in seismic prospecting, but they are characterized by several disadvantages which persons skilled in the art have been attempting to overcome. For example, the traces are not reproducible, and very often they overlap one another to produce an over-all presentation which is very difficult to interpret and analyze. Furthermore, it is necessary to pick out by hand apparent reflections in the traces and after the application of known mathematical relationships to correct the reflections for conventional seismic errors such as spread, distance-to-datum, and the like. This manual method of analyzing and interpreting these records is necessarily complex, time-consuming, and expensive.

Accordingly, it has recently been the trend in the art of seismic prospecting to record seismic observations—not as oscillographic traces—but rather as traces which are phonographically reproducible. These traces and apparatus and procedures for obtaining them have been generally described in U.S. Patent No. 2,051,153, Rieber. In general, the traces are characterized by possessing a substantially constant width throughout their length and by a variable intensity which is related to the magnitude of the signal generated by the transducer which is responsible for the trace. These traces include magnetic traces such as are recorded on magnetic tape, magnetic wire, etc.; and they also include photographic traces such as variable-density traces and variable-area traces.

Until very recently, it has been the practice in the art with respect to phonographically reproducible traces to restrict the use of these traces to original seismic records such as are obtained directly in the field. The records have always been considered to be very difficult to study and analyze directly, and it has been the practice to reproduce them in the form of oscillographic traces before attempting a study or analysis of them. Very recently, however, methods and apparatus have been developed for reproducing original records of the phonographically reproducible type and for directly correcting these records and thereafter re-recording them in the form of visual, corrected seismic sections. It has been now established that it is especially desirable to re-record the corrected original traces in the form of variable-density traces, since the resulting seismic section is characterized by a quality and appearance which greatly simplifies and accelerates the study and analysis of the records. Unfortunately, however, the apparatus and methods that have been developed to date for producing these very desirable types of seismic sections have been limited in application in that they have not been capable of processing original records of other than the phonographically reproducible type. Since a vast amount of seismic information and a vast number of original seismic records are in the form of oscillographic photographic or inked traces, it is eminently desirable to provide a process and apparatus for converting this type of information into sections of the type just described.

Accordingly, it is an objective of the present invention to provide means for translating linear graphs or traces into graphs or traces that have a reproducible quality. Further, it is an objective of the invention to provide an apparatus and procedure for translating seismic traces of the oscillographic type into seismic traces of a phonographically reproducible type which are preferably corrected for seismic errors during the very act of their translation. It is a particular objective of the invention to produce corrected seismic sections of a variable-density type from original seismic records of the oscillographic type. It is a further object of the invention to facilitate the study and analysis of oscillographic-type seismic records and to make it possible to avoid the necessity for using time-consuming manual methods for correcting and assembling these records in the form of corrected seismic sections.

These and related objectives of the invention will become more apparent in the following description, especially when the description is read in conjunction with the attached drawing.

Figure 1:
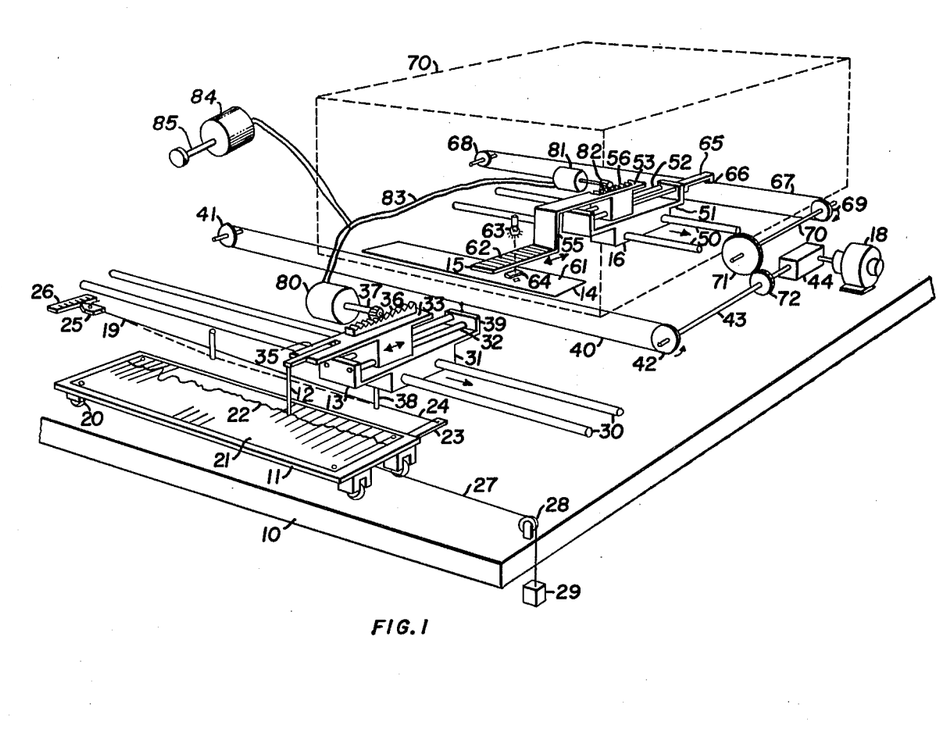
FIGURE 1 illustrates a preferred apparatus embodiment of the invention in perspective, schematic form.

Referring first to FIGURE 1, which illustrates a preferred embodiment of the invention, it will be seen that the invention in an apparatus form includes a base member 10, an original record holder or mounting 11, stylus 12, transfer mechanism 13, section holder 14, recording mechanism 15, recording drive mechanism 16, drive unit 18, and spread-correction device 19.

The record holder 11 is arranged to be longitudinally movable relative to base member 10 as by means of suitable supporting rollers 20. The record holder additionally is adapted to hold a conventional seismic record 21 on which are recorded oscillographic-type traces produced by a reflecting-mirror galvanometer or the like. It will be recognized that longitudinal distances and measurements along the length of the seismic record (and the record holder 11) corresponds to time measurements on the record itself. Furthermore, lateral distances or displacements on the seismic record correspond to variations in the amplitude of the seismic signals that are recorded on the record. In the figure, a trace 22, which is typical and representative of the traces that are obtained on conventional seismic records, has been depicted upon record 21.

Further relative to the record 21, it will be noted that this record is placed on record holder 11 in a manner such that the shallow end of the record—i.e., the portion of the record corresponding to reflections from shallow portions of the earth—is disposed toward the left end of the record holder in the figure. By locating the shallow end of the record in this manner, the record is properly coordinated with the spread-correction device 19 as will become more apparent later in this description.

An arm 23 is secured to one end of the record holder 11 as shown in the figure. It is preferred that this arm be connected to the end of the record holder which corresponds to the deep end of the record 21 in order to render the apparatus more compact in its construction.

Secured to the arm 23 is an elongated flexible member 24 which extends from the arm to a laterally adjustable anchoring member 25. The latter member may be conveniently mounted to base member 10; but it must be free to move laterally with respect to the longitudinal axis of the record holder 11—i.e., the longitudinal effective center line of each trace 22. Suitable mounting means for this purpose have not been illustrated in FIGURE 1 in order to avoid complicating the figure unduly; furthermore, the nature of such mounting means will be readily apparent to persons skilled in the art.

A suitable scale 26 is provided immediately adjacent anchoring member 25 so that the degree of lateral displacement of member 25 relative to the longitudinal axis of record holder 11 and trace 22 may be readily determined. Scale member 26 is also arranged transversely with respect to the longitudinal axis of record holder 11, and it is provided with a scale such that distances along the scale are proportional and related to the distances between the shot point location and the seismic transducer location producing the trace on the record 21. The scale may be calibrated in terms of feet or time, but it must be consistent with the time scale which is employed on the record itself. Thus, as will become more apparent in the following description, scale 26, anchor member 25, and elongated member 24 cooperate with one another to automatically correct each trace 22 on the record 21 for spread errors when these traces are translated into a corrected section on section holder 14.

Holder 11 is normally urged toward the right-hand side of the over-all apparatus in the figure as by means of a cable 27 which passes over pulley 28 and fastens to a suitable free-weight member 29. Elongated member 24 in combination with anchor member 25 prevents holder 11 from moving too far in the direction of weight 29. Additionally, weight 29 thereby keeps member 24 in a continuous state of tension. It will be apparent, of course, that other means such as springs or the like may also be adapted to serve this function of the invention.

Having described the main elements of the record holder 11, attention is now directed to the transfer mechanism 13 which includes stylus 12, longitudinal rods 30, lower body member 31, transverse rods 32, upper body member 33, arm 35, and transverse rack member 36.

Longitudinal rod members 30 are mounted at each end in vertically spaced relation with respect to base member 10. Suitable mounting means for this purpose will be readily apparent to persons skilled in the art, and inclusion of suitable means in the figure has not been made in order to keep the figure as clear and simple as possible.

Longitudinal rods 30 are arranged so that they extend substantially parallel to the longitudinal axis of holder 11 as well as the effective longitudinal axis of each record trace 22. Lower body member 31 is arranged to move along the length of the rods 30 as illustrated. This member is additionally arranged to support transverse rods 32 such that the longitudinal axes of the latter rods lie in a direction substantially perpendicular to the longitudinal axes of rods 30.

Upper body member 33 is arranged to be supported by transverse rods 32 and to move along the length of these rods as illustrated in FIGURE 1. Rack 36 is mounted upon upper body member 33 such that a gear 37 engaging the rack moves along the rack in a direction parallel to the transverse rods 32.

Stylus 12 is indirectly supported from upper body member 33 as by means of a projecting arm 35. This stylus may be a simple pointer, but it is preferably provided with a small light source at its lower end to enable the operator of the apparatus to more easily and accurately cause the stylus to follow along the length of trace 22. An illuminated stylus has been found to possess very desirable qualities in this regard.

At this point in the description, it will be noted that stylus 12, by virtue of the longitudinal movement along rods 30 and the transverse movement along rods 32, is capable of moving longitudinally as well as transversely relative to record holder 11 and record 21 located thereon. Thus, stylus 12 may be caused to accurately follow any undulations or oscillations that occur along the length of trace 22.

Dependent from lower body member 31 is a vertically disposed arm 38 which slides along and engages elongated member 24 as member 31 moves along rods 30. It is important to note that arm 38 must be arranged such that lateral displacement of anchor member 25 in a direction toward the arm causes additional tension to be set up within elongated member 24 sufficient to cause record holder 11 to move relative to base member 10. The nature and reason for this provision will become more apparent in the description that follows.

Lower body member 31 and the over-all transfer mechanism 13 are moved along the length of rods 30 in response to two forces. Thus, they are moved from the shallow end of the record 21 toward the deep end of this record (or in the direction indicated by the arrow in the figure)

by engaging a suitable driving member 39 which is secured to and propelled by the endless belt 40. In other words, member 39 travels along the endless belt 40 and engages and drives lower body member 31 each time that it moves from pulley 41 to pulley 42. These pulleys and the endless belt 40 are actuated and driven as by means of shafting 43, gear box 44, and drive unit 18.

As driving member 39 reaches pulley 42, the motion of transfer mechanism 13 is reversed and urged in the reverse direction along rods 30 toward pulley 41. This may be done in any convenient manner, as, for example, by reversing drive unit 18 or by decoupling the drive unit and pushing the transfer mechanism in the desired direction.

Recording drive mechanism 16 is essentially similar in construction to transfer mechanism 13 and is actuated simultaneously and in synchronism with the transfer mechanism. Thus, like the transfer mechanism, recording drive mechanism 16 includes longitudinal rods 50, lower body member 51, transverse rod members 52, upper body member 53, arm 55, and rack 56. The wedge or plate 62 of recording mechanism 15 is supported by means of arm 55 and is movable longitudinally and transversely relative to section holder 14 in substantially the same manner as transfer mechanism 13. Thus, recording mechanism 15 is movable in a longitudinal direction by movement of lower body member 51 along rods 50; and the wedge portion 62 is movable in a transverse direction by virtue of the movement of upper body member 53 along transverse rods 52. As noted above, the wedge 62 of the recording mechanism is supported indirectly from the upper body member 53, while the remaining portions of the recording mechanism are conveniently supported from the lower body member 51 so as to travel longitudinally therewith.

It will be noted that the only portion of the recording mechanism 15 that is movable transversely during the time that a trace is being transposed from record 21 to a section-recording medium 61 on section holder 14 is variable-density wedge or plate 62. This variable-density member varies progressively along its length in its optical density such that its light transmissibility varies likewise progressively along its length. Thus, in the figure, it will be seen that the outer or free edge of member 62 is substantially transparent, while the inner edge (i.e., the edge secured to arm 55) is substantially opaque.

Other components of the printing mechanism 15 that are illustrated in FIGURE 1 include light source 63, cylindrical lens 64, and a shutter, not illustrated. The light source and the lens are arranged such that light emitted by the source is transmitted through the variable-density member 62 and thence through the cylindrical lens 64 so as to form a line-shaped image on the section-recording medium 61 and so as to position this image at right angles to the longitudinal axis of the trace or traces which are formed on the record medium. The shutter is arranged between the light source and the variable-density wedge or between the wedge and the lens such that the width of the line-shaped image (i.e., the width of the trace formed) may be adjusted. This latter provision enables the operator to vary the width of each trace and to thereby arrange the traces laterally in the section in accordance with the field spacings of the seismic transducers which formed the original traces. A suitable calibrated adjusting device may be incorporated into the shutter device, and the entire assembly may be moved uniformly as a single entity.

Insofar as the recording mechanism 15 and the recording drive mechanism 16 are concerned, it will be appreciated that laterally relative movement between these mechanisms and section holder 14 must be possible so that a plurality of traces may be formed on recording medium 61 in a side-by-side relation. This feature or provision is most easily incorporated within the over-all assembly by making section holder 14 movable relative to base member 10 in a direction which is transverse to the longitudinal axis of the individual traces. Means suitable for moving the section holder in this manner will be readily apparent to persons skilled in the art, and inclusion of this feature in FIGURE 1 has not been done in order to render the figure easier to follow and understand.

It will be apparent that a photosensitive recording medium is called for as the section-recording medium 61 in the embodiment which is illustrated in FIGURE 1. It will also be recognized that a record medium of this type requires that the medium be protected or shielded from extraneous light sources in order to prevent undesired exposure of the medium. This precaution may be readily observed by enclosing the entire printing mechanism and section holder in a light-tight enclosure member 70 shown in dotted outline in the figure.

Longitudinal movement of the printing mechanism 15 along the rods 50 is attained in the apparatus of the figure in substantially the same manner as corresponding movement of the transfer mechanism 13. Thus, an arm 65 is secured to the lower body member 51 and engages a driving member 66 which travels along the length of the endless belt 67. Each time drive member 66 passes from pulley 69 to pulley 68, it is interrupted and reversed in the same manner as drive member 39. Thus, movement of the printing mechanism is at all times synchronized with movement of the transfer mechanism.

Endless belt 67 is driven by means of pulley 69 which in turn is driven by shaft 70 and gear 71 from a drive gear 72 which is mounted on shaft 43. The rate of travel of belt 67 relative to belt 40 is governed by selecting gears 71 and 72, for example, such that the rate at which printing mechanism 15 scans along section-recording medium 61 is properly proportional to the movement of stylus 12 along trace 22.

In order that stylus 12 may be moved from trace to trace on record 21, it is desirable that it be movable relative to arm 35 as illustrated, for example, in FIGURE 1. Thus, stylus 12 may be connected to an adjustable extension of arm 35.

Transverse motion of stylus 12 relative to record 21 may be coordinated with lateral movements of optical wedge 62 in a variety of ways. One particularly suitable means for attaining this objective is illustrated in FIGURE 1 and includes two selsyns 80 and 81, two gears 37 and 82, and a suitable power transmission medium 83. Thus, as stylus 12 is moved transversely relative to record 21, upper body member 33 is caused to move in a similar manner. Movement of the latter member causes rack 36 to move relative to gear 37, and gear 37 thereby causes selsyn 80 to be actuated. This motor in turn actuates selsyn 81 through coupling means 83; and wedge 62 is moved by relative movements of gear 82, rack 56, and upper body member 53.

Having identified the various structural members of the apparatus in FIGURE 1, attention is now directed toward the manner in which the apparatus operates.

First, a set of original traces in the form of record 21 is mounted on holder 11, and a suitable photosensitive recording medium is mounted on section holder 14. Stylus 12 is then positioned along the longitudinal axis or center line of a trace 22 at the shallow end of this trace. Printing mechanism 15 is transversely aligned with respect to recording medium 61 such that it corresponds with the position of trace 22 on record 21.

If a spread correction is to be incorporated within the information translated from trace 22, anchor member 25 is moved along scale 26 a distance which is proportional to the distance between the shot point location and the location of the geophone which generated trace 22 in the field. It should be noted at this point that elongated member 24 is normally constructed such that it is substantially parallel to the longitudinal axis of section holder 11 when anchor member 25 is aligned with a zero spread correction value on scale 26.

The shutter of the printing mechanism 15 is adjusted so as to provide a line-shaped image on record medium 61 which is properly related to the geophone spacing in the field. Light source 63 is preferably not turned on until it is actually desired to make a trace on the section-recording medium.

Drive unit 18 may be started, thereby causing transfer mechanism 13 and recording drive mechanism 16 to travel back and forth along the rods 30 and 50, respectively. The rate of travel of these two mechanisms is preselected such that an operator of the over-all assembly can readily follow oscillations in the movement of stylus 12 along the length of trace 22.

Each trace is preferably formed by continuously moving stylus 12 along the length of a trace 22 on the record 21 from the shallow end of the trace to the deep end of the trace. Thus, as stylus 12 begins its travel in this manner along trace 22, light 63 is turned on and printing of a trace on recording medium 61 is initiated. As stylus 12 moves transversely with relation to record 21, wedge 62 is correspondingly moved transversely relative to section-recording medium 61. Thus, a trace of variable density (in terms of photographic density) is created on the medium 61, the degree of exposure being directly related to the amplitude of the oscillations in the record trace 22.

As stylus 12 moves from the shallow end of each trace to the deep end of the trace, arm 38 causes progressively less tension to be generated in elongated member 24. This decrease in tension in turn, causes record holder 11 to move relative to stylus 12 in a manner which automatically corrects the transposed information at each depth for the spread between the shot point and the geophone generating the trace in question. It will be recognized that the length of member 24 must bear a relationship to the displacement of anchor member 25 along scale 26 which is proportional to the relationship between the actual depth equivalent to the length of trace 22 and the actual geophone spread in the field. It will further be recognized that the spread correction should be made with the shot point and the various geophone locations being first corrected to a common datum elevation. These corrections and other static corrections are well understood by persons skilled in the art and may be incorporated within the section produced on the record medium 61 by shifting the longitudinal position of section holder 14 from trace to trace as desired.

While stylus 12 may be actuated and caused to follow oscillations along trace 22 by hand, it has been found that markedly improved results and ease of operation may be obtained by coupling selsyns 80 and 81 to a common master selsyn 84, the shaft 85 of which can be turned by hand as desired to continually match stylus 12 with trace 22. As stated earlier herein, it has been found that a small light or other source of illumination on the tip of stylus 12 greatly facilitates the tracing or scanning operation.

Figure 2:
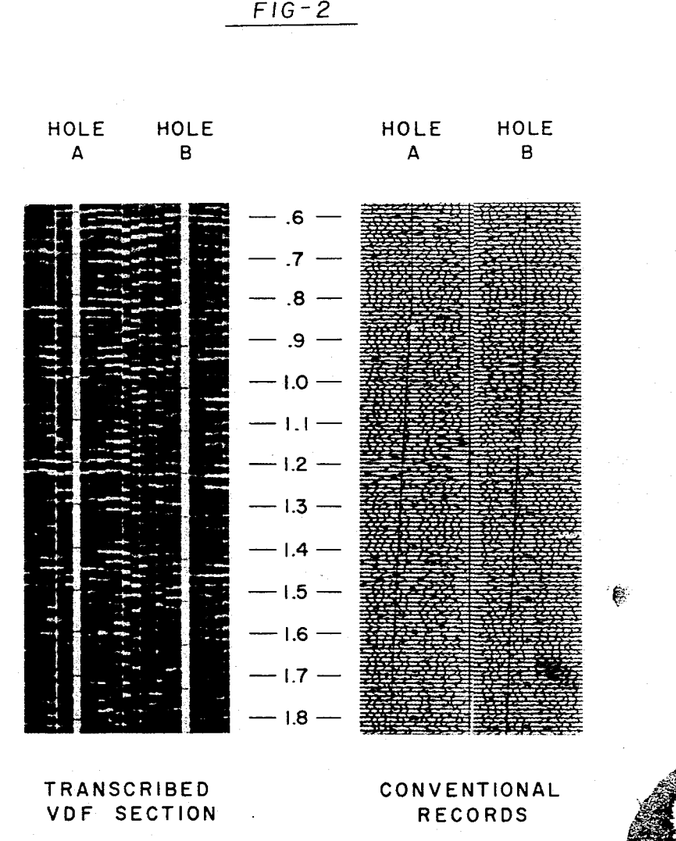
FIGURE 2 provides a comparison between two seismograms of the oscillographic trace type with a corrected variable-density seismic section prepared from the two seismograms in accordance with this invention.

In FIGURE 2 is presented a set of original oscillographic-type records, along with a variable-density section, which were prepared from the oscillographic records. It will immediately be apparent that the variable-density section provides a visual presentation which is greatly improved relative to the oscillographic traces. The reflections stand out much more clearly in the variable-density section, and the section is much more compact and properly scaled. Accordingly, it greatly simplifies the problem of studying and analyzing the recorded information and affords a degree of interpretation which is far superior to the oscillographic records.

In summary, it will be observed that the present invention in a broad apparatus concept embraces means for scanning a line graph and for generating a train of electrical signals which may then be recorded in the form of a variable-density or other phonographically reproducible trace graph. In the case of seismic records, the apparatus further provides means for greatly condensing the records and for seismically correcting the records in the step of translation to produce a seismic section which is in essence an accurate vertical profile of a portion of the earth. The invention makes it possible to rework vast numbers of old seismic records of the oscillographic type and to re-present these records in the form of much more desirable photographic records of the variable-density type. Furthermore, the invention makes it possible to completely utilize every bit of information in the original oscillographic records and substantially reduces the degree of subjective judgment that seismic interpreters have generally found it necessary to employ in studying seismic records.

It will be recognized that the invention is much broader in scope than the particular embodiment which has been described hereinbefore and illustrated in the accompanying drawing. Thus, it will be appreciated that the records to be transposed may be mounted on cylindrical drums or other convenient mounting devices. Likewise, the optical system of the illustrated printing mechanism in FIGURE 1 may be replaced with other printing mechanisms, depending upon the type of record medium that is employed to record the transposed information. Furthermore, when variable-density records are to be formed, a light source whose intensity of illumination is related to the strength of the signal supplied to the source may be substituted for the combination of the fixed-intensity light source and the variable-density wedge. A particularly suitable variable-intensity light source is a facsimile tube.

It is likewise contemplated that the spread-correction mechanism 19 may be replaced by other suitable electronic, electro-mechanical or mechanical means for incorporating this particular correction. The adaptation of the overall apparatus to various types of spread correctors will be reasonably apparent to persons skilled in the art.

It is also to be noted that means may be provided for correcting the traces for errors that may be occasioned by variations in the speed of the recording medium employed to obtain the original records. This may be done, for example, by providing a variable-speed transmission in place of or in combination with the gear box 44.

It is further to be noted that the variable-density records which are formed in accordance with the invention may take the form of variable-color records. Thus, in the apparatus in FIGURE 1, the variable-density wedge 62 may be a variable-color wedge varying in color from one end of the wedge to the other. With this arrangement, the beam of light transmitted from the light source 63 through the wedge to the lens 64 varies in its color, depending upon the portion of the wedge which lies between the source and the lens. The recording medium 61 in this instance is color film of a character to produce a variable-color trace in response to the variable-color light beam which impinged upon it.

Figure 3:
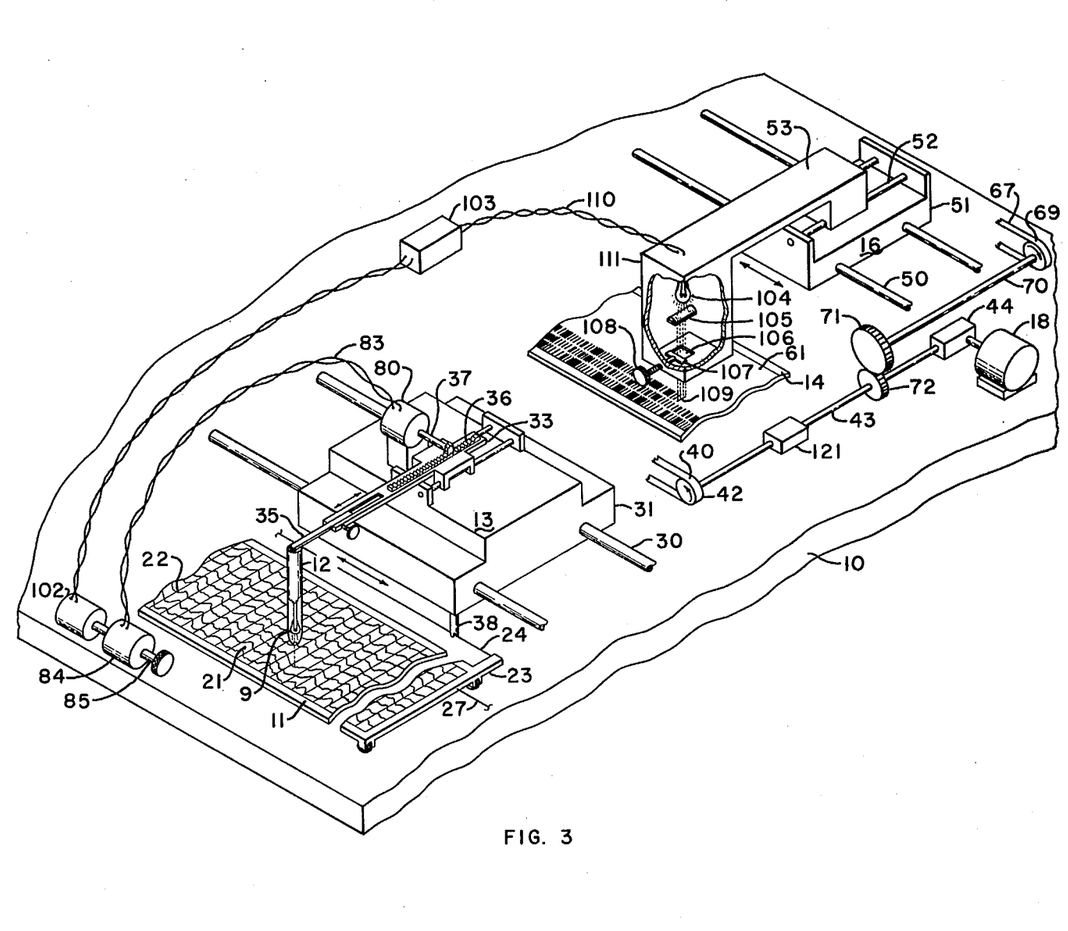
FIGURE 3 illustrates another preferred apparatus embodiment of the invention—again in perspective, schematic form.

FIGURE 3 is a schematic representation of another embodiment of the invention incorporating modifications of the nature set forth above. Thus, as will be explained in greater detail below, this figure includes an illuminated stylus, a recording mechanism using a variable-intensity light source, and a variable-speed transmission.

Referring specifically to FIGURE 3, it will be seen that a number of the structural components shown in FIGURE 1 are not included in this figure. The complete omission of some parts, and the fragmentary inclusion of others, has been practiced in an effort to simplify the drawing and also to highlight the components of interest. Similar parts in each figure are identified with the same legends.

Turning first in FIGURE 3 to the transfer mechanism 13, it may be seen that this mechanism is substantially identical with the equivalent mechanism in FIGURE 1 with a first exception that a modified stylus 12 is employed. Thus, the stylus in FIGURE 3 has been partially cut away to reveal a lamp 9 located near the lower end of the stylus. A hole at the lower end of the stylus enables a beam of light from the bulb 9 to direct itself against a trace 22 of interest on the record 21. As pointed out earlier in this description, the use of an illuminated stylus greatly facilitates the task of following a trace on the record 21. Errors occasioned by parallax are, for example, greatly minimized.

As illustrated in FIGURE 3, selsyn 80 is connected through cable 83 to master selsyn 84; and the latter selsyn is hand-actuated through shaft 85 by an operator so as to cause stylus 12 to follow lateral displacements of a trace such as trace 22. A potentiometer 102 of a conventional type—e.g., a Clarastat type 52–900—is actuated in response to shaft rotation of the selsyn 84; and electrical signals varying in magnitude with lateral displacement of stylus 12 are transmitted from the potentiometer to the light source 104. A suitable amplifier 103 may be inserted in the electrical circuit means 110 as desired.

Turning next to the printing mechanism shown in FIGURE 3, this mechanism employs a variable-intensity light source 104 in place of the fixed light source 63 of FIGURE 1. A typical example of a suitable variable-intensity light source is a Sylvania glow modulator—or facsimile-tube type 1B59/R1130B. If an amplifier 103 is desired for use in connection with this tube, the manufacturer recommends a 6L6 for this purpose.

Supported below source 104 is a cylindrical-type lens 105 adapted to focus a beam of light through aperture 106 to the recording medium 61. The lateral dimension of the light beam—i.e., the dimension of the beam transverse to the longitudinal axis of the traces on the recording medium—is adjustable in response to the adjustment device 108. This device is effective to move shutter 107 across the aperture 106. Thus, a light beam, whose intensity varies with lateral deflections of traces on record 21, is directed against the recording medium 61.

Lateral adjustment of the position of the recording mechanism in FIGURE 3 is possible by simply adjusting the upper body member 53 on rods 52. However, relative lateral movement between the printing mechanism and the recording medium 61 is ordinarily more easily obtained by lateral adjustment or movement of the record holder 14.

As with the recording mechanism of FIGURE 1, the recording mechanism of FIGURE 3 is driven along the length of recording medium 61 during each trace-recording at a predetermined rate by movement of and connection to the endless belt 67. Transfer mechanism 13 of FIGURE 3, however, unlike the transfer mechanism of FIGURE 1, may be moved at a variable rate in response to variable-speed transmisison 121. Transmission 121, which may be of any suitable conventional type, is inserted within the gear train from drive unit 18; and it is operable—as by hand control—to vary the rate of motion of stylus 12 along record 21.

As previously mentioned, variations in the recording speed of the original record 21 (or other known causes) may in some instances result in the record having inconsistent or variable dimensions along its length. In other words, the transverse lines along the seismograms 21 in both figures may be subject to unequal spacing. It is, of course, preferable to minimize or eliminate any degree of unequal spacing or distortion which may interfere with the quality of the reproducible records or sections produced by this invention. It will be apparent, then, that by noting beforehand the amount of distortion existing along the length of a seismogram 21, variable-speed drive 121 may be adjusted throughout a scanning operation so as to cause stylus 12 to move over equal time intervals along the seismogram in equal periods of time.

Figure 4:
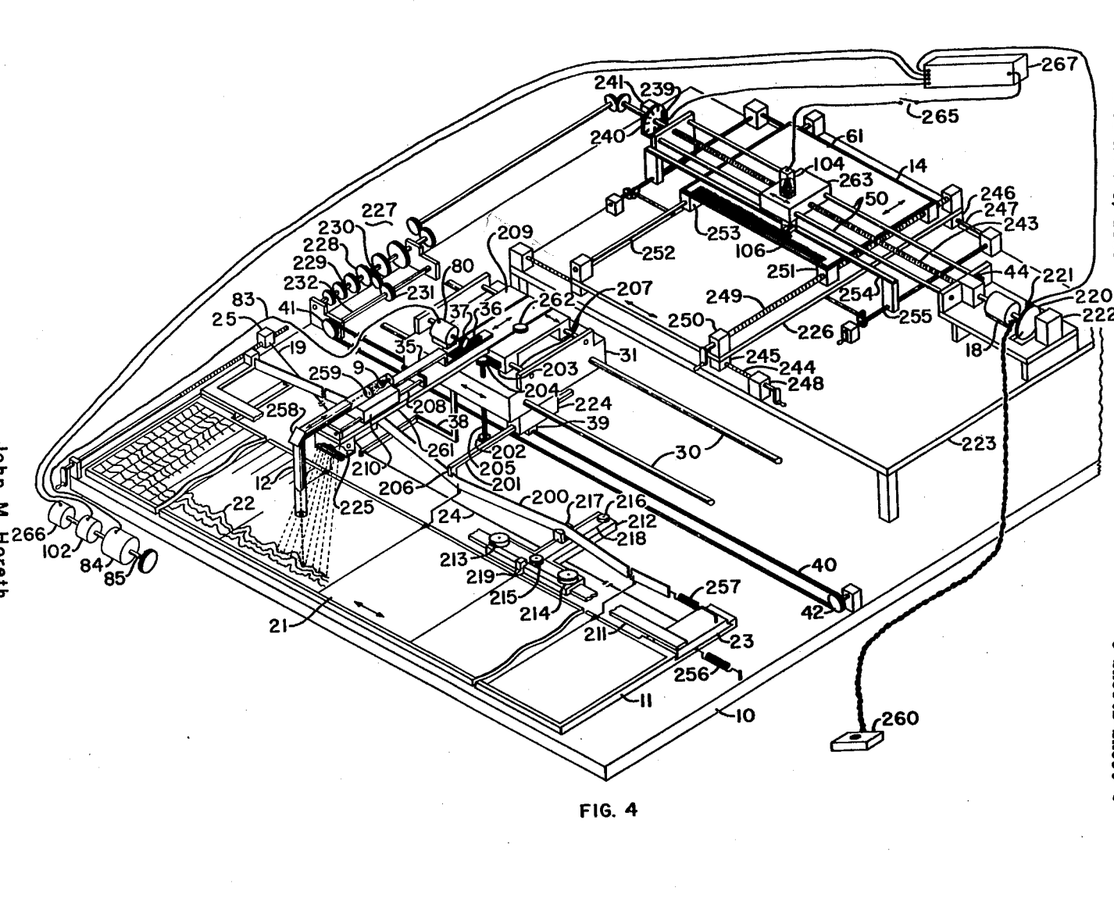
FIGURE 4 illustrates still another preferred embodiment of the invention, also in perspective schematic form.
Figure 5:
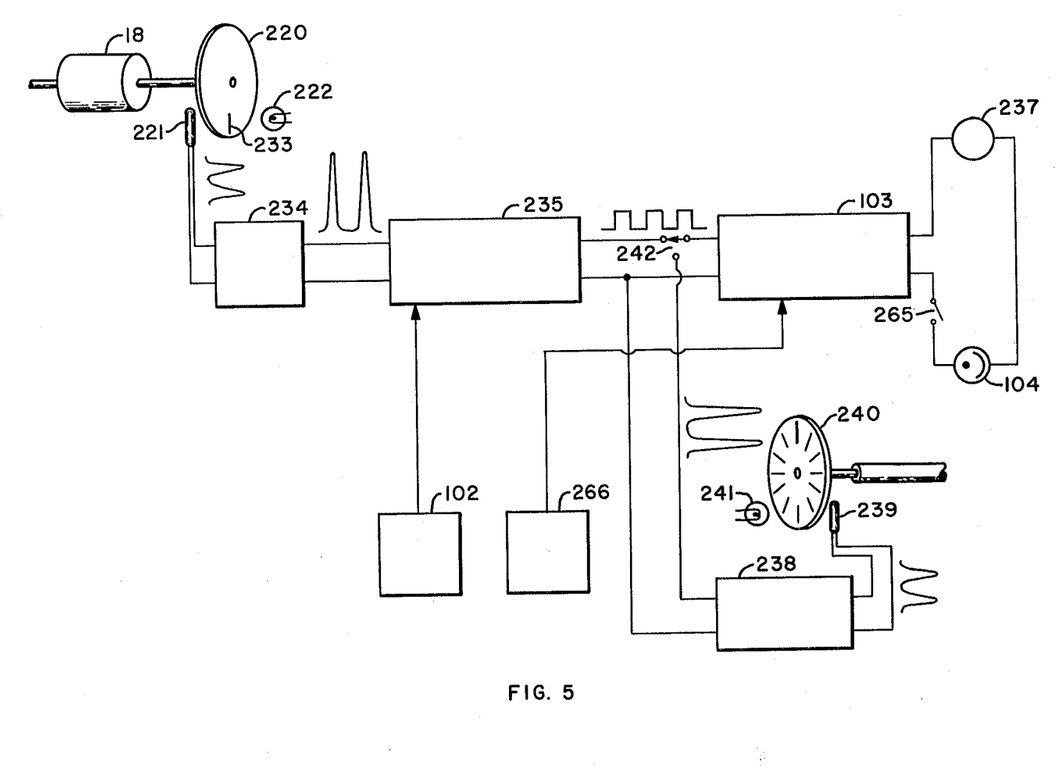
FIGURE 5 is a block circuit diagram of a suitable printing mechanism to be used with the apparatus of FIGURE 4.

An especially preferred embodiment of the invention is shown in FIGURES 4 and 5. Once again, apparatus components shown in these figures, which are also shown in FIGURES 1–3, are identified by the same legends.

Differences between the apparatus of FIGURE 4 and that shown in the preceding figures lie primarily in the mechanism for scanning the oscillographic records; the addition of a mechanism for scanning oscillographic seismograms having different time scales; the specific means for mounting and adjusting the position of the recording medium; and the printing circuit means for recording a variable density-type seismic section on the recording medium. Another difference lies in the specific type of mechanism used to enable the seismogram-scanning means to scan a seismogram in a manner to compensate for time errors occasioned by variations in the speed of the recording process used to obtain the seismogram.

Referring first to the seismogram-scanning means, it will be noted that this mechanism includes a lower body member or carriage 31 slidably mounted on rods or carriage bars 30; upper carriage 209 slidably supported from carriage 31 on bars 207; and undercarriage 224 rigidly supported from carriage 31 and in turn supporting driving member 39. Stylus arm 35 is supported by transverse carriage 210, which in turn is slidably supported on transverse carriage bars 208. Thus, rotational movements of pinion gear 37 together with rack 36 cause carriage 210 and arm 35 to move laterally relative to the movement of carriage member 31 along bars 30.

Transverse bars 208 are supported from arm 261 which is slidably mounted on upper carriage 209, and which can be locked in position by means of locking screw 262. Arm 38 is rigidly connected to carriage member 31 and, at its outer extremity, rides along flexible member 24. Member 24, as in the previous figures, forms part of a spread-correction mechanism 19.

Rack 201 engages lower pinion 202 and is slidably mounted within undercarriage 224. Cam follower 206 at the end of rack 201 is adapted to ride along the linear cam or tape 200. Lower pinion 202 drives upper pinion 204 through shaft 205. Upper pinion 204 engages rack 203 on upper carriage 209. Linear light source 225 at the outer end of arm 261 directs a faint beam of light on seismogram 21 coincident with a point of light projected by stylus 12. Adjustment of arm 261 aligns the beam from source 225 with the zero axis of traces on seismogram 21 and helps the operator to follow them. Light source 9 in stylus 12 directs a beam of light focused by lens 259 and reflected by mirror 258 as a spot down to the seismogram.

Linear cam or tape 200 extends the length of seismogram 21. It is mounted rigidly at one end to bar 211 and under tension at its other end to spring 257. Spring 257 is secured to arm 23.

A mechanism in FIGURE 4 operable with the scanning mechanism to compensate for any time-line spacing variations along the record 21 includes a plurality of pulley assemblies 212 mounted on and spaced along calibrated reference bar 211, which is mounted on record holder 11. One such assembly is shown in the figure; but additional assemblies (e.g., one corresponding to each black arrow) are contemplated. Assembly 212 includes two pulleys 213 and 214; translation pulley 215; lateral pulley 216; clamp 217; index member 219; and wire 218. Movements of index member 219 along the seismogram 21 cause clamp 217 to move equal distances in a transverse direction. Record holder 11 has a reference mark for aligning the "break times" of successive seismograms. Since the "break time" on any given seismogram may not coincide exactly with a "time line," it is desirable that bar 211 be adjustable slightly along record holder 11. Then, the zero time mark on the bar can be aligned with a convenient time line—preferably a line adjacent the "break time." This line—although not the actual zero time for the seismogram—is commonly called the "zero time line."

In operating the apparatus of FIGURE 4, a number of pulley assemblies equal to the number of major time divisions along seismogram 21 are conveniently employed. Thus, if a five-second record is to be examined, five pulley assemblies may be used, one for each second of record time. The "zero time" line on the seismogram is aligned with the zero mark on the bar 211; and, if no variations exist in the spacing of the lines on the seismogram, they should correspond or line up with the time lines on the bar. Then, when the index members of the pulley assemblies are positioned opposite certain time lines on the calibrated bar, they will also be opposite corresponding lines on the seismogram. However, if any of the time lines on the seismogram are distorted and do not properly line up with the lines on the bar, the index members of the pulleys are adjusted and aligned with the time lines on the seismogram. This causes their respective clamps to be transversely displaced corresponding distances from the base line of the linear cam 200.

If no timing distortions exist in the seismogram 21, the base line of the cam 200 is parallel to the time axes of the traces on the seismogram. Otherwise, it has departures along its length so that the cam follower 206 and arm 201 move laterally in-and-out, thereby causing upper carriage 209 to move back-and-forth parallel to the time axis of the seismogram. Upon consideration, then, it will be apparent that the stylus 12 is made to advance relatively faster or slower than the printing mechanism 263 along the recording medium 61, depending upon the existence of any timing errors in the seismogram 21. In other words, the cam 200 together with its cam follower and associated parts enable stylus 12 and aperture 106 to travel along the lengths of their respective records in substantial time synchronism.

Referring for the moment to the recording medium 61, it will be apparent that it is desirable to print all seismic sections so as to possess the same time-distance relationships. In other words, it is desirable that a given linear length along each section correspond to the same amount of recording time in seconds. Upon reflection, this could cause a problem with regard to conventional oscillographic seismic records, since the physical lengths of such records for equal lengths of recording time vary substantially. To overcome this difficulty, a speed changer 227 is provided in the apparatus of FIGURE 4. The changer employs a plurality of driver gears 228 mounted on drive shaft 229, a movable idler gear 230, a movable driven gear 231, and a drive shaft 232. Thus, depending upon the selection of the driver gear 228, the driven gear 231 and its shaft 232 are made to turn at different speeds. As a result, the speed of the belt 40 is variable and can be made to correspond to the speed of the printing mechanism 263 along the recording medium 61. It will be recognized, of course, that a continuously variable speed transmission may be readily used in place of the transmission shown.

The entire printing portion of the apparatus of FIGURE 4 may be mounted directly upon the base plate 10. In the figure, it is shown to be located on a platform 233. Film holder 14 is supported on nuts 251 which engage trace-positioning lead screw 249, and on bearing blocks 253 which slidably engage rod 252. Platform 226 similarly is supported by nuts 245 and bearing blocks 246 which movably engage static-correction lead screw 244 and rod 247, respectively. A slit-width bar 254 extending the length of film tray 264 is transversely adjustable upon movement of the lead screw 255. Thus, the width of the beam of light projected from the aperture 106 can be readily adjusted. It will be appreciated that the entire printing portions of the apparatus shown in FIGURE 4 are preferably positioned within a light-tight enclosure.

Longitudinal movement of printing mechanism 263 and of stylus 12 is effected by movement of lead screw 243 in response to reversible and variable-speed motor 18 through gear box 44. Motor 18 may conveniently be a D.C. motor actuated by a foot-operated motor control rheostat 260. Thus, the operator of the apparatus shown in FIGURE 4 can readily control the rate of travel of the stylus 12 (and of the printing head 263) along their respective records. In the case of the printing head 263, any variations in its rate of travel (unless compensated for) will introduce variations in the photographic exposure of the film 61. A satisfactory means of compensating—permitting rate of travel variations—is provided in the illustrated apparatus by virtue of electronic components 267, etc. controlling the light source 104. For the purpose, the light source is preferably a facsimile tube or glow modulation tube having a linear intensity response with variations in the amplitude of signals applied to it. The electronic components and associated parts—shown in FIGURES 4 and 5—include shutter disc 220, constant-intensity light source 222, photo cell 221, amplifier 234, a one-shot multivibrator 235, glow tube driver amplifier 103, and facsimile tube (or glow modulator tube) 104. Signals from the potentiometer 102 control the grid voltage of the first stage of the multivibrator 235 and thereby vary the pulse width of the multivibrator's constant amplitude square wave pulses. For a more complete description of the circuitry, reference is made to patent application Serial No. 652,414, filed April 12, 1957, now U.S. Patent No. 3,040,520, in the name of W. L. Ikard.

For the purposes of the present description, it will be apparent that the disc 220, upon being rotated by the motor 18, causes an electrical pulse to be generated by the photocell 221 each time the slot 233 passes between the photocell and the light source 222. The pulse, after amplification, triggers the one-shot multivibrator. The multivibrator output consists of constant-amplitude pulses, which drive the glow modulator tube 104. Each pulse acts as an on-off switch for the glow tube. Thus, for a series of pulses, the glow tube produces light pulses that expose the film 61. For example, a satisfactory frequency is such that, for every linear inch of travel of head 263 along medium 61, the glow tube exposes the recording medium about 800 to 900 times. If the line-shaped beam of light emitted from the slit 106 has a dimension of about $\frac{1}{32}$ inch along the length of the record medium 61, the frequency of exposures will appear as a substantially continuous trace along the recording medium.

Since the motor 18 is rigidly coupled to the lead screw 243, which drives the glow tube 104 along the medium 61, it is evident that, regardless of the motor or scanning speed, the same number of pulses expose the medium per linear unit (e.g., inch) of scan.

Modulation of the glow tube signal is accomplished as stated above by varying the pulse width of the multivibrator's constant-amplitude square wave pulses. This is done by means of potentiometer 102 which controls the grid voltage of the first multivibrator stage. Since each pulse acts as an on-off switch, it is evident that the pulse width will determine the amount of exposure, because the amount of exposure is a function of time. The modulation potentiometer 102 conveniently is integrally mounted upon the frame of a hand-operated selsyn or synchro-transmitter 84 and is coupled directly to the synchro-shaft 85.

In order that the pulse-width modulation of the apparatus in FIGURE 4 will furnish complete blacks on the photographic film 61, the amplitude of the pulses driving the glow tube should also be somewhat modulated. To achieve this amplitude modulation, another potentiometer 266 is preferably used to vary the cathode bias of the glow modulator driver tube 103. The latter potentiometer may also be mounted on the synchro-transmitter in tandem with the potentiometer 102.

In adjusting the glow tube 104 and its associated circuitry, it is desirable that it develop a neutral or essentially gray effect upon a photographic film when the stylus 12 is coincident with the zero amplitude value of a trace on seismogram 21. Thus, as the stylus swings to one or the other side of the axis of the trace, the glow tube prints either a progressively lighter, or darker, trace on film 61. A variable-density effect on the film is thus produced.

Also driven by lead screw 243 is slotted time-line generator disc 240 which is interposed between light source 241 and photocell 239. Then, as shown in FIGURE 5, signals generated by the photocell may be passed through amplifier 238 and applied through switch 242 and the driver 103 to the glow tube 104 to record time lines along each trace on the film 61. If time lines are not desired for every trace, switch 242 may be actuated as desired.

In order to limit the travel of printing mechanism 263 and stylus 12 along their respective records, suitable limit switches may be used to de-energize motor 18. Return of the printing mechanism from one end of the film to the other may be achieved by reversing motor 18. Glow tube 104 should not be energized at such times, and a switch 265 may be provided in this connection. A milliammeter 237 may be used to calibrate the glow tube as desired.

The manner of operating the apparatus in FIGURES 4 and 5 will be reasonably apparent upon examination of the figures, when taken in conjunction with the principles and apparatus explained previously in this description. However, to further clarify its operation, it may be assumed that a photographic film is used as the recording medium 61 and that a conventional oscillographic-type seismogram 21 is mounted upon the record holder 11. Then, assuming a given static correction for trace 22, the longitudinal position of the film 61 is adjusted relative to a reference time line so as to incorporate the desired static correction within the trace reproduced upon the film. This adjustment is achieved by turning the hand crank attached to the lead screw 244 which moves platform 226.

Similarly, a spread correction is incorporated within the reproduced trace by adjusting the lateral position of the anchor member 25 along its lead screw. This causes longitudinal movement of the record holder 11 and seismogram 21 against the spring 256. The action, in general, of the spread-correction device 19 has previously been described and need not be repeated here.

The positions of the index members 19 are lined up with their corresponding time lines on seismogram 21, and the clamps 217 of the pulley assemblies 212 are then fixed. The proper gear ratio is also selected for the speed changer 227 so as to coordinate or synchronize movements of the stylus 12 and the printing head 263. The width of the light beam (i.e., the dimension of the beam transverse to the length of the trace to be recorded) emitted from slit 106 is adjusted as necessary by movement of the lead screw 255 and its bar 254 to correspond to the physical width to be represented by the trace in the section produced. A cylindrical lens, not shown, may be used between light source 104 and slit 106 to produce a sharp line-shaped image on film 61.

Having made the above adjustments, and having positioned the stylus 12 and the printing head 263 at corresponding positions along the seismogram 21 and the recording medium 61 (i.e. at their respective zero time lines) operation of the apparatus may be started. Thus, foot-operated pedal 260 is depressed, causing motor 18 and lead screw 243 to turn. This movement causes the stylus 12 and the printing head 263 to move along their respective traces. Simultaneously, the operator turns the shaft 85, causing motors 84 and 80 to turn, and also causing potentiometers 102 and 266 to transmit variable-amplitude signals to the glow tube 104. Motor 80 causes stylus 12 to follow lateral undulations in the trace 22, while light from the light source 225 is continuously aligned with the zero axis of the trace. Thus, the variable-amplitude nature of the trace 22 in the seismogram 21 is converted into a variable-density photographic trace upon the recording medium 61. At the conclusion of its reproduction in this manner, another trace in the seismogram may be reproduced after again making the necessary adjustments described above.

It should be noted that, in traveling along trace 22, any time-wise distortions of the trace are compensated for by lateral departures of the cam follower 206 along the cam 200. The cam follower, by its transverse motion, causes corresponding longitudinal movements of the stylus 12 and thereby continuously positions the stylus at its proper position along trace 22. A similar effect may be produced in the apparatus of FIGURE 1, as mentioned earlier, through the use of a variable-speed transmission in place of or in combination with gear box 44. Thus, such a transmission may be manually controlled to vary the rate of travel of the stylus 12 relative to the rate of travel of the recording mechanism 15 and thereby keep the stylus and the recording mechanism properly synchronized. This system, however, is less preferred than the cam mechanism shown in FIGURE 4. A more complete description of the latter mechanism is set forth in patent application Serial No. 655,694, filed April 29, 1957, now U.S. Patent No. 2,924,810, in the name of John M. Horeth.

What is claimed is:

1. An apparatus for translating an oscillographic seismic trace into a phonographically reproducible trace which comprises a flat surface adapted to support the seismic trace and having a longitudinal dimension parallel to the time axis of the trace, a stylus movable at a predetermined rate along the seismic trace and movable laterally from the time axis of the trace to follow oscillations in the trace, a recording medium and recording means of a character to record a phonographically reproducible trace, said recording means being movable along the recording medium at a predetermined rate and simultaneous with longitudinal movement of said stylus along said seismic trace, means to vary the intensity of the reproducible trace in response to and proportional to variations in the amplitude of the lateral movement of said stylus, means to impose a variable rate of longitudinal movement on said stylus in addition to said predetermined rate of longitudinal movement for the stylus, and analog spread correction means to move said flat surface longitudinally and simultaneously with longitudinal movement of said stylus.

2. An apparatus for preparing a variable-density seismic section from a seismogram comprising a plurality of oscillographic-type traces arranged side-by-side in common arrival time relation which comprises: a flat surface member adapted to support said seismogram, a stylus, a photosensitive film, a second flat surface member adapted to support the photosensitive film, recording means of a character to direct a variable-intensity line-shaped beam of light against the film, means to adjust the length of the line-shaped beam, means to move said recording means in a direction transverse to the length of said beam and along the photosensitive film at a predetermined rate, means to move said stylus sequentially along the length of each oscillographic trace at a predetermined rate in synchronism with movement of said recording means, said stylus being laterally movable relative to the center line of each oscillographic trace to follow amplitude variations in the trace, means responsive to the amplitude of the lateral movements of said stylus to correspondingly vary the intensity of the light beam from the recording means, means to move said second supporting surface longitudinally to incorporate a static seismic correction within each variable-density trace, means to move said second flat surface laterally to record said variable-density traces in a side-by-side relation, and analog spread correction means operable during the movement of said stylus along each oscillographic trace to move said first flat surface longitudinally relative to said stylus to incorporate a spread correction within the corresponding variable-density trace.

3. An apparatus as defined in claim 2 including speed-transmission means to superimpose a variable rate upon said predetermined rate of longitudinal movement of said stylus.

4. An apparatus as defined in claim 2 in which the recording means is a variable-intensity light source.

5. An apparatus as defined in claim 2 in which the recording means comprises a fixed-intensity light source and a variable-density light filter interposed between the light source and the film.

6. An apparatus for preparing a seismic section of the variable-density type from a seismogram comprising a plurality of oscillographic-type traces arranged in a side-by-side relationship on a common arrival-time basis which comprises in combination: means for mounting said seismogram, means for mounting a photosensitive film, stylus means for sequentially scanning along each oscillographic trace, means to generate a train of electrical signals in response to lateral movements of said stylus in following the oscillations in each oscillographic trace, the magnitude of each instantaneous electrical signal being related to the amplitude of the corresponding instantaneous oscillation in an oscillographic trace, light projection means variable in intensity in response to said electrical signals arranged to expose said photosensitive film, means to move said projection means along said film at a predetermined rate and in synchronism with the aforesaid longitudinal movement of said stylus, analog spread correction means to move said seismogram mounting means longitudinally relative to said stylus means so as to correct each said variable-density trace for spread error, and means to position each variable-density trace longitudinally relative to every other variable-density trace to correct for static seismic error.

7. An apparatus for preparing a reproducible trace seismic section from a seismogram consisting of a plurality of oscillographic-type traces which comprises a first flat surface for mounting the seismogram and having a longitudinal dimension parallel to the time axis of the oscillographic traces, a stylus, means to move said stylus separately and sequentially along each oscillographic trace at a predetermined rate, manually operable means to move said stylus laterally from the longitudinal axis of each trace so as to follow amplitude variation in the trace, a recording medium, a second flat surface adapted to support said medium and having a longitudinal dimension corresponding with the longitudinal dimension of the medium, recording means movable at a predetermined rate along the recording medium and cooperable therewith to form a phonographically reproducible trace, said recording means being movable simultaneously with movement of said stylus so as to form a separate reproducible trace for each oscillographic trace, means to effect lateral movement between said recording means and said medium to record the reproducible traces in a side-by-side relation, means responsive to said manually operable means to generate a train of electrical signals, the amplitude of each signal being proportional to the corresponding instantaneous amplitude of lateral movement of said stylus relative to an oscillographic trace, said recording means responsive to said electrical signals to vary the intensity of the reproducible trace, means for longitudinally positioning the second flat surface for each reproducible trace for static error.

8. An apparatus as defined in claim 7 including analog spread correction means adapted to move said seismogram longitudinally relative to said stylus simultaneously with movement of the stylus along an oscillographic trace to enter spread corrections within the corresponding reproducible trace.

9. An apparatus as defined in claim 8 in which the recording medium is a photosensitive film and the recording means is a light source variable in intensity in response to said electrical signals.

10. An apparatus as defined in claim 9 including transmission means to superimpose a variable rate of longitudinal movement upon said predetermined rate of longitudinal movement for said stylus.

11. In an apparatus for translating an oscillographic seismic trace record into a reproducible trace record including trace follower means to effect a scanning motion along the oscillographic trace, recording means in movable relation with a reproducible record medium and responsive to said trace-follower means to record a trace on said medium varying in a reproducible quality in accordance with the oscillations in said oscillographic trace, the improvement which comprises means operable upon the occurrence of timing distortions along said oscillographic trace to vary the rate of said scanning motion relative to the rate of motion between said recording means and said record medium to correct the reproducible trace for such distortions and means to correct said reproducible record trace for seismic errors existing in said oscillographic trace.

12. An apparatus as defined in claim 11 in which the reproducible record medium is photosensitive film and the recording means is of a character to form a variable-density trace on said film.

13. In an apparatus for translating an oscillographic seismic trace record into a reproducible seismic trace record including trace-follower means arranged in scanning relation with said oscillographic trace, a reproducible record medium and recording means arranged in longitudinally movable relation with said medium and responsive to scanning motions between said trace-follower means and said oscillographic record to record a trace on said medium varying in a reproducible quality in accordance with the oscillations of said oscillographic trace, the improvement which comprises spread correction means arranged to move said oscillographic trace record lengthwise relative to said trace-follower means to enter a continuous spread correction within said reproducible trace, and additional means to vary the rate of said scanning relative to the rate of said recording.

14. An apparatus as defined in claim 13 which includes flat surface means arranged to support said oscillographic trace record and to be movable in response to said spread correction means to provide movement of said oscillographic trace record lengthwise relative to said trace-follower means.

15. In a method of translating an oscillographic seismic trace record into a reproducible seismic trace record which includes the steps of scanning the length of the oscillographic trace record and simultaneously recording the reproducible trace record while varying the reproducible quality of the latter trace record in response to oscillations in the oscillographic trace record, the improvement which comprises varying the rate of scan of the oscillographic trace record relative to the recording rate of the reproducible trace record upon the occurrence of time distortions in the oscillographic trace record to keep said trace records in seismic record time synchronism.

16. A method as defined in claim 15 wherein the reproducible trace record is recorded at a constant rate.

17. A method as defined in claim 15 in which the oscillographic trace record requires spread correction along its length, and the oscillographic trace record is moved during the scanning step to incorporate such a correction with the reproducible trace record.

18. In a method of translating an oscillographic seismic trace record requiring spread correction and having time distortions along its length into a corrected reproducible seismic trace record which includes the steps of scanning the length of the oscillographic trace record and simultaneously recording the reproducible trace record while varying the reproducible quality of the latter trace record in response to oscillations in the oscillographic trace record, the improvement which comprises causing a first difference between the rate of scanning and the rate of recording to enter a continuous spread correction within the reproducible trace record, and simultaneously causing a second difference between the rate of scanning and the rate of recording upon the occurrence of time distortions in the oscillographic trace record to correct said reproducible trace record for said time distortions.

19. In a method of translating an oscillographic seismic trace record requiring spread and static corrections and having time distortions along its length into a corrected reproducible seismic trace record which includes the steps of scanning the length of the oscillographic trace record and simultaneously recording the reproducible trace record while varying a reproducible quality of the latter trace record in accordance with oscillations in the oscillographic trace record, the improvement which comprises effecting a time-wise displacement between the trace records to incorporate a static correction within said reproducible trace record, moving the oscillographic trace record during the scanning step to incorporate a continuous spread correction along the reproducible trace record, and varying the rate of the scanning step to correct said reproducible trace record for said timing distortions.

20. In an apparatus for translating an oscillographic seismic trace record into a reproducible seismic trace record, said oscillographic seismic trace record being a record with time of seismic energy detected by a seismic transducer and wherein longitudinal intervals along said oscillographic seismic trace record are preselected to correspond to preselected intervals of seismic record time, said apparatus including trace-follower means operable to move laterally as well as longitudinally relative to said oscillographic trace record so as to follow oscillations in said oscillographic trace record, and recording means operable upon movement of said trace-follower means along said oscillographic trace record to form along a reproducible record medium a reproducible seismic record trace which varies in intensity in accordance with the magnitude of lateral movements of said trace-follower means, the improvement which comprises means to move said recording means along said reproducible record medium movements which are simultaneous with and in proportion to longitudinal movements of said trace-follower means along said oscillographic seismic trace record whereby the movements of said recording means and the longitudinal movements of said trace-follower means are in seismic record time synchronism, and means operable upon the existence of a longitudinal distortion in a longitudinal interval along said oscillographic seismic trace record, which distortion causes the distorted longitudinal interval to correspond to an interval of seismic record time other than the interval of seismic record time preselected for such longitudinal interval, to change the rate of longitudinal movement of said trace-follower means along the distorted longitudinal interval relative to the rate of movement of said recording means along said reproducible record medium so as to correct for such distortion and thereby maintain the longitudinal movement of said trace-follower means and the movement of said recording means in seismic record time synchronism.

References Cited in the file of this patent

UNITED STATES PATENTS

| | | |
|---|---|---|
| 2,604,955 | Hawkins | July 29, 1952 |
| 2,803,515 | Begun et al. | Aug. 20, 1957 |
| 2,886,243 | Sprague | May 12, 1959 |
| 2,921,740 | Dobbins et al. | Jan. 19, 1960 |
| 2,931,566 | Strassner | Apr. 5, 1960 |